United States Patent [19]

Kurz

[11] Patent Number: 5,082,501

[45] Date of Patent: Jan. 21, 1992

[54] METHOD OF PREPARING BUILDING MATERIALS

[76] Inventor: Fredrik W. A. Kurz, Nysatravagen 12, S-181 61 Lidingo, Sweden

[21] Appl. No.: 611,450

[22] Filed: Nov. 9, 1990

Related U.S. Application Data

[63] Continuation of Ser. No. 569,227, Aug. 17, 1990, which is a continuation of Ser. No. 344,208, Apr. 27, 1989, abandoned, which is a continuation-in-part of Ser. No. 71,794, Jun. 11, 1987, abandoned.

[51] Int. Cl.$^5$ .............................................. C04B 7/153
[52] U.S. Cl. ................................... 106/789; 106/790; 106/801; 106/690; 106/691
[58] Field of Search ............... 106/789, 790, 801, 690, 106/691

[56] References Cited

FOREIGN PATENT DOCUMENTS

| | | | |
|---|---|---|---|
| 272267 | 2/1991 | European Pat. Off. | |
| 54-099126 | 8/1979 | Japan | 106/789 |
| 55-080747 | 6/1980 | Japan | 106/789 |
| 58-140356 | 8/1983 | Japan | 106/789 |
| 00473 | 4/1987 | PCT Int'l Appl. | |
| 0663678 | 5/1979 | U.S.S.R. | 106/789 |
| 0718396 | 3/1980 | U.S.S.R. | 106/789 |
| 0808461 | 2/1981 | U.S.S.R. | 106/789 |

*Primary Examiner*—Karl Group
*Assistant Examiner*—Anthony J. Green
*Attorney, Agent, or Firm*—Ladas & Perry

[57] ABSTRACT

A method of making a building material by activation of latently hydraulic finely ground granulated basic blast-furnace slag to form a direct acting hydraulic binder. The slag is mixed with water, sand and ballast material as well as with a combination of acidic and basic components. The acidic components consist of phosphates, optionally in combination with strongly acting sulfates, and the basic components consist of oxides or other compounds of earth metals, optionally in combination with zinc. Thereby, a concrete having great mechanical strength and high chemical resistance is obtained.

16 Claims, No Drawings

METHOD OF PREPARING BUILDING MATERIALS

This is a request for a filing under the file wrapper continuing application Procedure, 37 CFR 162, for a continuation of prior complete application Ser. No. 07/569,227, filed on Aug. 17, 1990 which is a continuation application of Ser. No. 07/344,208 filed Apr. 27, 1989 (now abandoned) which is a continuation-in-part application of Ser. No. 07/071/794 filed June 11, 1987 (now abandoned).

Portland cement is generally considered as the best hydraulic binder, which only by addition of water and aggregate hardens to form a rock-like material (concrete) within a few hours to obtain finally its ultimate strength within about one month. The effect is due mainly to chemical reactions between basic lime and silicic acid. Analysis of Portland cement shows about 64% CaO, 20 % SiO2, 2.5 % MgO, 6 % Al2O3 3.5 % Fe2O3 +FeO, 2% K2O +Na2O, 1.5% SO3. A disadvantage of cement is that not all lime is bound in the concrete and that a consistently appearing excess of unstable hydrate of lime, which is formed towards the end of the hardening process, is relatively easily leached out by the action of water and carbon dioxide in the air, involving a danger of detrimental carbonization. Furthermore, the chemical resistance to acidic and basic attack is very limited.

Example: Destruction of concrete surfaces on roads by road salts or of concrete bridges by sea-water. Risk of rust attack on steel reinforcement and great difficulties with glass fibre reinforcement.

To avoid the sometimes disturbing weakness of Portland cement, materials having a similar composition but with an enhancement of the components improving both the physical and the chemical resistance have long been sought. It was natural to experiment with finely ground granulated basic blast-furnace slag as it has a high percentage of highly resistant substances. The analysis is as follows, varying with the source: about 30 to 40 CaO, 35 to 40% SiO2, 7 to 10% MgO, 10 to 20% Al2O3, 0.5 to 2% Fe2O3 +FeO, 1 to 2% K2O +Na2O, 0.5 to 3% SO3. Compared to Portland cement, the lime content is only about one-half, but SiO2 and Al2O3 is about double, and MgO almost four times higher. These substances, however, impart to silicates the highest mechanical and chemical resistance, i.e. increased compressive and tensile strength and resistance to chemical action.

Blast furnace slag is obtained largely as a useless residual product in the manufacture of iron and steel and is present internationally in hundreds of millions of tons. "Granulated" generally means "subdivided", but in connection with slag it is commonly meant that the slag in a still red-hot state has been subjected to rapid cooling with water or with a combination of cold water and cold air, whereby the slag becomes vitreous and amorphous. In spite of the favorable chemical composition, the finely ground granular blast-furnace slag is only "latently" hydraulic, i.e. it does not bind automatically after admixture with water. The reason is that a dense gel rich in silicic acid is formed said gel enclosing the slag grains and preventing hydration. A condition for accomplishing activation is that this gel is broken. Thus, activators have a double task; they must first break down the gel and then react with the slag itself. However, the gel formation also has a positive effect, since the gel pores are uniformly distributed, whereby a better resistance to frost is obtained than with capillary pores in Portland cement concrete.

Already toward the end of the nineteenth century attempts to activate blast-furnace slag were made. The oldest patent goes back to 1892 (Passow), wherein a mixture of slag with Portland cement is recommended and wherein the free lime in the form Ca(OH)2 formed in the final stage of hydration functions as an activator. Thereby, the reaction with slag occurs late and gives rise to a slow development of strength. Also the risk of shrinkage in cooling is rather great. This is the reason why in many countries the so-called slag cement is hardly used at present.

In addition to lime, prior known activators (see H. Khl, Zement-Chemie, Berlin 1951) are alkalies and sulfates. Hitherto, it was thought that activation with alkalies resulted in the highest strength values, but it resulted in a number of disadvantages. The long-term strength is not satisfactory, and there are great risks of shrinkage, salt deposition microcracks, and carbonatization. Setting occurs too quickly, in 10 to 30 minutes, wherefore casting in a building site is not possible. Use is limited to the manufacture of prefabricated or precast units. Activation by alkalies also has the disadvantage that strong caustic NaOH is formed. Activation by sulfates has the disadvantage of an inferior short-term strength and a risk of swelling. For all these known methods it is also difficult to control the rate of setting which is either too rapid or too slow.

The setting time has to be controlled according to the circumstances. There are different well-known actions which can be applied if a short setting time is required, for example, a finer grinding of the components and high temperature of about 50–80° C. during the first day of setting. Activation by alkalies is the most widely used activation method today but this method is already too rapid, therefore, the above actions for controlling the setting time cannot be applied. Nor are these actions suitable for the prior known mixture of slag and Portland cement, because the activator Ca(OH)2 is formed in the final step of hydration after several hours.

A retardation of the setting time is possible by sulfates or Plaster of Paris. In the claimed method, an addition of less than 3 % by weight is suitable, but the prior known activation by alkalies requires a much larger amount resulting in damaging expansion of the produced concrete.

A much more reliable activation technique is obtained by the combination of acidic and basic components wherein the acidic component consists preferably of phosphates, optionally in combination with strongly acting sulfates, and the basic components are earth metal oxides and optionally also zinc oxide, and addition of water resulting in a hydraulic reaction. Earth metal oxides are magnesium oxide, calcium oxide, strontium oxide, barium oxide, aluminum oxide, beryllium oxide, gallium oxide, indium oxide, thallium oxide, titanium oxide, and zirconium oxide and the so-called rare earth metal oxide. Most effective is magnesium oxide, which has the best improving effect on silicates, as it enhances the compression and tensile strengths and the elasticity, reduces shrinkage and results in a non hygroscopic product. Normally MgO can be incorporated in silicates only by melting at a high temperature. Together with phosphates, optionally in combination with sulfates, a hydraulically acting reaction is achieved with finely ground granulated basic blast-furnace slag. The best action is obtained with calcined magnesia (fired at about 1750.C., whereby all water and carbon dioxide have been driven off). Less suitable are MgO containing minerals, e.g. dolomite, which act more as fillers. Furthermore dolomite, $MgCa(CO_3)_2$, contains calcium, which reacts directly with phosphate forming apatite, as generally known. However apatite is not a binder. The earth metal oxides are suitably included in an amount of 0.3 to 3 % by weight, based on the dry concrete (i.e. slag +sand +aggregate) or 2 to 20 % by weight based on the slag.

The acidic components are suitably included in an amount of 0.3 to 6 % by weight, based on the dry concrete, or 2 to 40 % by weight based on the slag.

The building material formed according to the invention has a low calcium content compared to building materials formed, for example, with Portland cement, and no unbound lime. Compared to Portland cement the lime content is about one-half. Furthermore, all components used in the activation of blast-furnace slag according to the claimed method are compounds of low calcium content, which means a calcium content below 3 % by weight of the slag.

Furthermore, it was found that the reaction will be much more active if a detergent is also added which reduces surface tension, disperses and prevents lump formation. Surface tension reducing agents are detergents such as complexed polyphosphates; nitrates such as dicyandiamide; alcoholates such as glycol and glycerine; oils; cellulose derivates and sulphates. The surface tension reducing agent is usually present in an amount of 0.1-2 % by weight of the slag. A phosphate having surface tension reducing action such as sodium tripolyphosphate will act both as an acidic component and a surface reducing agent. MgO and phosphate per se do not react with slag and water, only in combination.

Sometimes it is advantageous to use a combination of MgO with other earth metal oxides. $Al_2O_3$ has positive effects similar to those of MgO, improves the reactivity of the slag and its resistance to chlorides. Titanium oxide imparts resistance to acidic actions, e.g. in contaminated air (sulfur deposition), and forms resistant crystals with silica gels. $ZrO_2$ gives a reliable security against alkaline attack.

An example of a strongly acting sulfate is sodium bisulfate, $NaHSO_4$, which on account of its strongly acidic reaction is often used industrially instead of sulfuric acid.

The hitherto known activators mostly set too rapidly (in the case of Portland cement too slowly), and no suitable control could be achieved. This is possible with the claimed method, either by addition of 0.1-2% by weight of surface-tension reducing agents or fluxing (plasticizing) agents, e.g. lignosulfonate, melamine, naphthalene-formaldehyde, sodium gluconate or the like, or by plaster of Paris or anhydrite (about 3 %) or by using a mixture of different phosphates having different times of reaction. Thus, it will be possible to obtain a binding agent which will harden within half an hour for prefabricated concrete elements, whereby more precast units can be made per day, or it will be possible to increase the setting time to about 2.5 hours which will be necessary for casting on a building site.

By the addition of amorphous silicic acid, e.g. in the form of the filtered residual product from electrometallurgical processes (such as silicon ferrosilicon or silicon chrome manufacture), having an $SiO_2$ content between 75 and close to 100 % and usually a specific area of at least 20 $m^2/g$, so called silica fume or silica, the compressive strength and density can be further improved, preferably in combination with plasticizing agents.

The amorphous silicic acid is suitable used in an amount of 0.6 to 2 % weight, based on the dry concrete or 4 to 15 % by weight, based on the slag.

The new material is denser than concrete from Portland cement, is brighter is color and lighter in weight. The new concrete can also be used as a plaster or porous or light-weight concrete, if a pore-forming agent or light-weight aggregate of the type of perlite, or vermiculite or heat expanded porous clay pellets is added. The light-weight aggregate can be included in an amount of about 10–60% by weight, depending on the intended use of the concrete. Of course, it is possible to mix the concrete with steel, glass, mineral or plastic fiber reinforcement in an amount of about 5 % by weight. A combination with bitumen (asphalt) is also possible.

The advantage of the improved slag concrete according to the present invention as compared to common concrete from Portland cement is above all a higher compressive and tensile strength, as seen from the table below. This includes both a higher short-term strength which enables removal of moulds in building sites to be carried out after about 10 hours for wall mouldings and after about 16 hours for vault mouldings, which results in great savings, and also an increasing strength for several months, while conventional concrete reaches maximum values after about 28 days.

The resistance to salt was tested at Chalmers Institute of Technology in Gothenburg, Sweden for 4 months in a 30 % calcium chloride solution. No deterioration or cracking could be observed, as occurs in common concrete after a few weeks in highly concentrated calcium chloride solution.

Protection against attack by rust is achieved in common concrete by the free lime in the form of $Ca(OH)_2$ formed in the final stages of hydration being deposited on the steel surfaces and protecting by its high pH the steel from oxidation by penetration of water, oxygen or $CO_2$ from the air. However, calcium hydroxide is an unstable substance which is dissolved by water and converted by $CO_2$ (carbonatization). In the new concrete, MgO which has a higher pH than lime forms the rust protection. Calcined MgO is resistant to water, oxygen and $CO_2$ and therefore more reliable than lime. In addition, the new concrete is much denser (less porous) and therefore makes more resistance to penetrating water, oxygen or $CO_2$, which also results in an improved adherence to the steel reinforcement. The stability of the high pH value in the new concrete was also checked at Chalmers Institute of Technology by means of a bath of phenolphthalein which is a pH indicator. Permanent high pH is seen from unchanged red color which is not the case with Portland cement concrete.

The combination of MgO and phosphate is hitherto known mostly from the manufacture of refractory ceramics but will also result in an improved fire-resistance of the activated blast-furnace slag. Usual concrete does not withstand temperatures higher than about 500° C.

The reason for the sensitivity to high temperatures of Portland cement is substantially the presence of chemically bound water. The physically bound water (capillary water) is removed at about 105° C. without any deleterious action. The chemically bound water is released later, but with cracking which will then result in decomposition. The unstable free lime $Ca(OH)_2$ will be converted into $CaCO_3$ and $H_2O$, by $CO_2$ in the air. At the same time the liberated water will also attack the tri- and dicalcium silicates formed during hydration which will be converted into unstable calcium silicate hydrate. While concrete of Portland cement consists of calcium-silica-hydrate, which leaches out by $CO_2$ in the air, in the new concrete an absolutely stable calcium-silica-magnesia-alumina-hydrate is formed. In addition, the alpha phase of quartz ($SiO_2$) present in the concrete will be converted into a different crystal form with increase in volume, which will also contribute to cracking (see R.K. Iler "Chemistry of Silicates"). In the combination of blast-furnace slag, phosphate and MgO there is no free lime and the $SiO_2$ of the granulated slag is amorphous, wherefore these risks are not present. In uses where temperatures above 1000° C. can occur, it may be suitable to replace the stone material of aggregates which may expand in heat, with refractory ceramic materials. This is required only in an exceptional case.

The new concrete may also be combined with bitumen (asphalt) in road pavings.

As examples of the action of the new combination of activators with regard to compressive and tensile strengths, reference may be made to the following test results obtained with a mixture of 100 weight percent of slag, 10 units of sodium tripolyphosphate, 7.5 weight percent of MgO, 353 units of sand and 40 units of water.

| Age | Compressive strength MPa | Tensile strength MPa |
| --- | --- | --- |
| 1 day | 6.2 | 1.2 |
| 3 days | 26.0 | 3.7 |
| 7 days | 40.9 | 6.3 |
| 28 days | 81.3 | 10.4 |

These values are more advantageous than the corresponding values of Portland cement (after 28 days 49.0 and 7.9 MPa, respectively). By the additions mentioned above, the tabled values can be further improved.

As compared to Portland cement concrete the novel concrete achieves the following advantages.

1. Higher mechanical resistance, i.e. higher compressive and tensile strengths.
2. Higher chemical resistance.
3. No carbonatization, i.e. precipitation of unbound lime, which may result in deterioration of the concrete.
4. No salt attack. A road paving will not be damaged by road salt. A longer life for concrete bridges A possibility of making resistant concrete boats.
5. Not alkaline in spite of pH 12. No unbound lime, wherefore reinforcement by glass fibres is possible. (If desired, a special type with $ZrO_2$ may be manufactured).
6. Lighter than Portland cement concrete, structures may be made thinner.
7. The possibility of making thinner layers or thickness makes the construction cheaper, apart from the fact that slag is cheaper than Portland cement.
8. Much denser.
9. Better adherence to steel and better protection against rusting of the steel adhered to the concrete.
10. Higher refractoriness (fire resistance).
11. Resistance to frost.
12 Facilitates casting in cold weather.
13. Better material than cement mortar for plastering, because of an improved adherence to concrete.
14. Lower requirements for moist hardening of freshly cast concrete
15. Similar to usual concrete, the new material may be rendered porous to obtain a light-weight concrete which has great advantages as compared to traditional porous concrete and light-weight concrete, since the cell structure is mechanically stronger and the new material is not hygroscopic.
16. Lighter color.

I claim:

1. In a method of making a building material by activation of latently hydraulic ground granulated amorphous basic blast-furnace slag to form a direct acting hydraulic binder, wherein the method comprises mixing the slag, with water, sand, gravel, and an activator, said slag, water, sand, gravel and activator being present in amounts effective to enable the slag to react chemically with the water, in combination with the sand and gravel, to produce a concrete of desired strength, the improvement comprising forming the activator as a combination of an acidic component and a basic component, said acidic component being a phosphate or mixture of phosphates in an amount of 2 to 40% by weight based on the amount of the slag, said phosphate or mixture of phosphates having surface tension reducing action or said method further comprising adding a detergent or mixture of detergents to said slag, sand, gravel, and activator, said basic component being magnesium oxide, or magnesium oxide in combination with aluminum oxide, titanium oxide, zirconium oxide, or zinc oxide, said basic component being present in an amount of 2 to 20% by weight based on the amount of the slag, said improvement causing the formation of a concrete of great mechanical strength and high chemical resistance with the magnesium oxide and phosphate or mixture of phosphates incorporated into the concrete without the need for heating at a high temperature.

2. The method as in claim 1, wherein the acidic component is sodium tripolyphosphate.

3. The method as in claim 1, further comprising adding plaster or Paris, anhydrite, plasticizing agents, or a combination thereof in an amount effective to alter the rate at which the concrete hardens.

4. The method as in claim 1, further comprising adding an amorphous silic acid in an amount of 4 to 15% by weight of the slag.

5. The method as in claim 1, further comprising adding a component selected from the group consisting of steel, glass, mineral, and plastic fiber in an amount sufficient to reinforce the concrete.

6. The method as in claim 1, further comprising adding material having a high porosity in an amount sufficient to form a concrete suitable for use as porous concrete.

7. The method as inn claim 1, wherein the slag comprises 30–40% CaO, 35–40% $SiO_2$, 7–10% MgO, 10–20% $Al_2O_3$, 0.5–2% $Fe_2O_3$+FeO, 1–2% $K_2O$+$Na_2O$ and 0.5–3% $SO_3$.

8. The method as in claim 1, wherein the building material has no unbound lime.

9. The method, as in claim 1, wherein the activator further comprises an acidic sulfate, said phosphate or mixture of phosphates and said acidic sulfate together being present in an amount of 2 to 40% by weight based on the slag.

10. The method as in claim 9, wherein the acidic sulfate is NaHSO$_4$.

11. The method as in claim 1, wherein the basic component is magnesium oxide in combination with aluminum oxide, titanium oxide or zirconium oxide.

12. The method as in claim 11, wherein the basic component is magnesium oxide in combination with titanium oxide or zirconium oxide.

13. The method as in claim 1, wherein the basic component is magnesium oxide.

14. A method as in claim 1, wherein the mixing of the slag, water, sand, gravel and activator causes a hydraulic reaction with the slag and wherein the improvement comprises including as the phosphate or mixture of phosphates a phosphate having sufficient surface tension reducing action to reduce surface tension among reactants of said hydraulic reaction, to disperse said reactants and to prevent lump formation among said reactants.

15. A method as claimed in claim 1 wherein the mixing of the slag, water, sand, gravel and activator causes a hydraulic reaction with the slag, wherein said method includes the addition of said detergent or mixture of detergents and wherein the improvement comprises mixing the slag, sand, gravel and activator with said detergent or mixture of detergents in an amount effective to reduce surface tension among reactants of said hydraulic reaction, to disperse said reactants and to prevent lump formation among said reactants.

16. A method as claimed in claim 3 wherein plaster of Paris or anhydrite is added in an amount of about 3% by weight based on the slag.

* * * * *

UNITED STATES PATENT AND TRADEMARK OFFICE
CERTIFICATE OF CORRECTION

PATENT NO. : 5,082,501

DATED : January 21, 1992

INVENTOR(S) : Fredrik W. A. Kurz

It is certified that error appears in the above-identified patent and that said Letters Patent is hereby corrected as shown below:

On the title page, after the Related U.S. Application data, insert

--Foreign Application Priority Data

October 14, 1985  Sweden .......8504754-6--

Signed and Sealed this

Sixth Day of July, 1993

Attest:

MICHAEL K. KIRK

Attesting Officer   Acting Commissioner of Patents and Trademarks